(12) United States Patent
Henke et al.

(10) Patent No.: US 10,778,070 B2
(45) Date of Patent: Sep. 15, 2020

(54) AUTOMOTIVE ELECTRIC MOTOR

(71) Applicant: PIERBURG GMBH, Neuss (DE)

(72) Inventors: Toni Henke, Drebach (DE); Enrico Lindner, Penig (DE); Mathias Zill, Nossen (DE)

(73) Assignee: PIERBURG GMBH, Neuss (DE)

( * ) Notice: Subject to any disclaimer, the term of this patent is extended or adjusted under 35 U.S.C. 154(b) by 0 days.

(21) Appl. No.: 16/311,684

(22) PCT Filed: Jul. 6, 2016

(86) PCT No.: PCT/EP2016/065983
§ 371 (c)(1),
(2) Date: Dec. 20, 2018

(87) PCT Pub. No.: WO2018/006953
PCT Pub. Date: Jan. 11, 2018

(65) Prior Publication Data
US 2019/0334415 A1    Oct. 31, 2019

(51) Int. Cl.
| | |
|---|---|
| *H02K 11/026* | (2016.01) |
| *H01R 39/36* | (2006.01) |
| *H01R 4/02* | (2006.01) |
| *H01F 17/02* | (2006.01) |
| *H01F 27/28* | (2006.01) |
| *H01F 17/00* | (2006.01) |

(52) U.S. Cl.
CPC ........... *H02K 11/026* (2013.01); *H01R 4/021* (2013.01); *H01R 4/029* (2013.01); *H01R 39/36* (2013.01); *H01F 17/02* (2013.01); *H01F 27/2823* (2013.01); *H01F 2017/0093* (2013.01)

(58) Field of Classification Search
CPC ........ H02K 5/14; H02K 13/06; H02K 23/004; H02K 23/16; H01R 39/36
USPC .................................................. 310/248, 249
See application file for complete search history.

(56) References Cited

U.S. PATENT DOCUMENTS

2002/0105246 A1    8/2002 Ooyama
2012/0291277 A1    11/2012 Kain et al.
(Continued)

FOREIGN PATENT DOCUMENTS

CN    203352387 U    12/2013
CN    104242588 A    12/2014
(Continued)

OTHER PUBLICATIONS

Machine Translation JP2014057446 (Year: 2014).*
Machine Translation JP11307216 (Year: 1999).*

*Primary Examiner* — Jose A Gonzalez Quinones
(74) *Attorney, Agent, or Firm* — Norman B. Thot

(57) ABSTRACT

An automotive electric motor with a mechanical commutation. The automotive electric motor includes a stiff coil wire comprising a welding portion and an end portion which is arranged adjacent to the welding portion, and a flexible braid wire with a wire end which is electrically and mechanically connected to the stiff coil wire at the welding portion via a welding. The end portion of the stiff coil wire includes an end surface. The end portion of the stiff coil wire is bent in relation to the welding portion so that the end portion is bent away from the flexible braid wire and the end surface of the end portion of the stiff coil wire does not face the flexible braid wire.

9 Claims, 2 Drawing Sheets

(56) References Cited

U.S. PATENT DOCUMENTS

2013/0264900 A1   10/2013  Ichihara
2015/0028705 A1    1/2015  Yamaguchi

FOREIGN PATENT DOCUMENTS

| JP | H06-311708 A | | 11/1994 | |
|----|--------------|---|---------|---|
| JP | 11307216 A | * | 11/1999 | ........... H01R 24/562 |
| JP | 2014057446 A | * | 3/2014 | |

* cited by examiner

AUTOMOTIVE ELECTRIC MOTOR

CROSS REFERENCE TO PRIOR APPLICATIONS

This application is a U.S. National Phase application under 35 U.S.C. § 371 of International Application No. PCT/EP2016/065983, filed on Jul. 6, 2016. The International Application was published in English on Jan. 11, 2018 as WO 2018/006953 A1 under PCT Article 21(2).

FIELD

The present invention relates to an automotive electric motor with a mechanical commutation.

BACKGROUND

The present invention in particular relates to an automotive electric motor for driving components or devices of an automobile. Such components or devices could, for example, be auxiliary units, actuators or pumps. The automotive electric motor according to the present invention is accordingly not an engine of the automobile for driving the vehicle. The automotive electric motor is mechanically commutated so that commutator brushes are necessary which are in permanent contact with a commutator ring. The automotive electric motor comprises a coil wire for electrically connecting the commutator brushes with a power source.

A common automotive electric motor for driving auxiliary units, actuators or pumps has an electric performance of up to approximately 500 W so that an electric current of 10 of up to 40 A with an on-board voltage of 12 or 24 V is required. The wire consequently has a diameter of at least a couple of millimeters in order to reduce the electric resistance of the coil wire. The coil wire, which can define, for example, a choke coil, therefore has a high stiffness so that it cannot be directly mechanically connected to the commutator brushes. A flexible braid wire is provided between the commutator brushes and the stiff coil wire to allow for movements of the brushes and vibrations of the coil wire. The braid wire is provided with a wire end which is electrically and mechanically connected to the coil wire by welding. The flexible braid wire can be a brush wire electrically connecting the coil wire with the commutator brush.

The stiff coil wire end is in practice defined by a machine cutting so that a burr and/or a sharp edge can result at the end surface which has been cut. The burr or sharp edge can damage the braid wire, which is connected to the coil wire, during the lifetime of the automotive electric motor. The braid wire is defined by a multiple number of thin wires each of which is sensitive to be cut by the burr or sharp edge of the coil wire. A failure of the electric motor can occur in case the braid wire is substantially severed. A failure could also occur if merely a majority of the thin wires are cut. The remaining thin wires are in this case fused due to the high electric current. The lifetime and the reliability of the automotive electric motor is consequently limited. In order to prevent such damage, additional complex manufacturing steps are necessary in order to remove the burr and sharp edges. Manufacturing costs are accordingly increased.

SUMMARY

An aspect of the present invention is to provide a reliable automotive electric motor with a mechanical commutation where manufacturing costs are reduced.

In an embodiment, the present invention provides an automotive electric motor with a mechanical commutation. The automotive electric motor includes a stiff coil wire comprising a welding portion and an end portion which is arranged adjacent to the welding portion, and a flexible braid wire comprising a wire end which is electrically and mechanically connected to the stiff coil wire at the welding portion via a welding. The end portion of the stiff coil wire comprises an end surface. The end portion of the stiff coil wire is bent in relation to the welding portion so that the end portion is bent away from the flexible braid wire and the end surface of the end portion of the stiff coil wire does not face the flexible braid wire.

BRIEF DESCRIPTION OF THE DRAWINGS

The present invention is described in greater detail below on the basis of embodiments and of the drawings in which.

DETAILED DESCRIPTION

Figure 1:
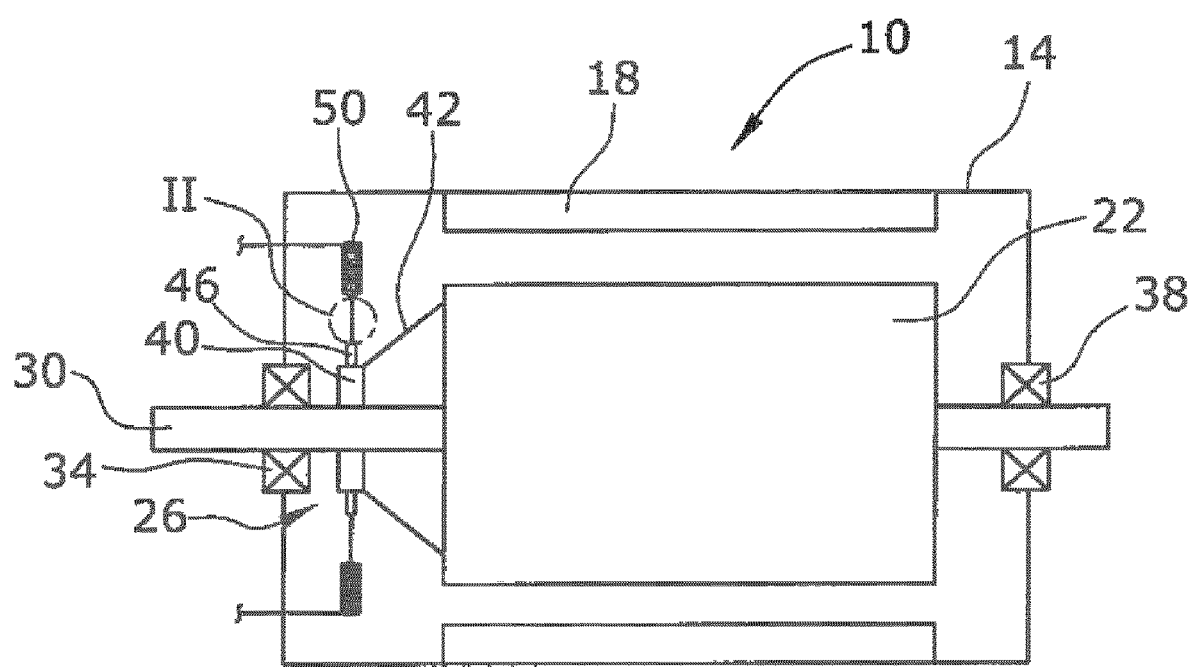
FIG. 1 shows a schematic drawing of an automotive electric motor according to the present invention.

The present invention provides that a stiff coil wire is provided with a welding portion and an end portion adjacent to the welding portion. The wire end portion is bent in relation to the wire welding portion and is thereby bent away from the braid wire so that a wire end surface of the wire end portion of the coil wire does not face the braid wire. The term "welding" according to the present invention is not limited to the welding process as such, but may also be a soldering process. The welding portion according to the present invention is an axial section of the coil wire where the braid wire is allowed and intended to be welded to the coil wire. In this axial section, the braid wire can be connected to the coil wire by spot-welding or by welding over a defined longitudinal section. Between the welding portion and the end portion, which is provided adjacent to the welding portion, the coil wire is bent and thereby changes the axial direction. The end portion is therefore bent in relation to the welding portion. The end surface according to the present invention is the surface of the coil wire which is generated by the cutting process.

According to the present invention, the end surface does not face the braid wire if a projected longitudinal axis of the wire end axis does not cross the braid wire. By bending the end portion according to the present invention, a sharp edge of the wire end surface will always be provided in a distance to the braid wire so that abrasion, kinking and breaking of the braid wire can be excluded. Damages of the braid wire during the mounting process or during operation due to vibrations will also no longer occur. The lifetime and reliability of the automotive electric motor will thereby be increased.

The complex manufacturing step of deburring the sharp edges of the wire end surface can also be omitted. Manufacturing costs can thereby also be decreased.

In an embodiment of the present invention, a bending angle between the wire welding portion and the wire end portion of the coil wire can, for example, be in the range of 60°-120°. The axial direction of the wire welding portion and the axial direction of the end portion enclose and define the bending angle. The specified bending angle has the effect that the end surface of the wire end portion does not face the braid wire so that damage of the braid wire is securely prevented.

In an embodiment of the present invention, a welding area can, for example, face to a direction which is substantially orthogonal to a longitudinal direction of the wire end portion of the coil wire. The welding area according to the present invention is the area where the coil wire is materially bonded to the braid wire. The welding area, which is at least a part of an outer circumferential surface of the coil wire, which is facing to a lateral direction, is substantially orthogonal to the direction of the welding portion of the coil wire. The welding area is therefore facing to a direction which is substantially orthogonal to the plane, which is defined by the longitudinal axis of the wire end portion of the coil wire and by the longitudinal axis of the welding portion of the coil wire. The specified arrangement has the effect that the mounting space in the axis of the wire end portion can be kept small.

In an embodiment of the present invention, the coil wire end surface can, for example, be inserted into a pocket. According to the present invention, the pocket can be formed like a hopper or a concave portion. The pocket can, for example, be defined by a part of the motor housing or frame or by a part supporting the coil wire, for example, a brush card. The pocket restricts the freedom of movement of the coil wire end portion. As the movement of the coil wire is restricted, the dynamic load on the welding connection between the braid wire and the coil wire is reduced so that the lifetime of the welding connection is increased.

The coil wire end portion can be inserted loose into the pocket. The wire end surface is alternatively fixed in the pocket. According to the present invention, the term "fixed" means that the wire end surface is tightly provided and fixed in the pocket. A mechanical load acting on the welding between braid wire and coil wire generated, for example, by vibrations is thereby significantly reduced. The lifetime and reliability of the electric motor will thereby be accordingly increased.

In an embodiment of the present invention, the end portion of the coil wire can, for example, be provided with a sharp edge. The sharp edge, such as a burr, which results from the cutting process of the coil wire does not need to be removed. The manufacturing step of removing the sharp edge is accordingly omitted. The automotive electric motor can accordingly be manufactured more economically.

The coil wire can, for example, define a choke coil. Electromagnetic interferences generated by the brush sparking can be minimized with the choke coil. Electromagnetic emissions, which can disturb other electronic devices in the automobile, can consequently be significantly reduced.

In an embodiment of the present invention, the flexible braid wire can, for example, define a brush wire of a mechanical commutator arrangement. The braid wire has a high flexibility so that relative movements of the brushes in relation to the coil wire can be compensated without a fatigue break of the braid wire.

A detailed description of an embodiment of the present invention is set forth below under reference to the drawings.

FIG. 1 shows a schematic drawing of an automotive electric motor 10 with a mechanical commutation. The electric motor 10 comprises a motor housing 14 which houses a motor stator 18, a motor rotor 22, and a commutator arrangement 26. The motor rotor 22 is arranged on a rotor shaft 30 which is rotatably supported at the motor housing 14 via a first and a second bearing 34, 38. The motor stator 18 is arranged inside the motor housing 14 surrounding the motor rotor 22. The commutator arrangement 26 comprises a commutator ring 40 which is arranged on the rotor shaft 30. The commutator ring 40 is electrically connected by electrical connections 42 to rotor windings of the motor rotor 22. The commutator arrangement 26 further comprises two commutator brushes 46. The commutator brushes 46 are provided in radial electrical contact with the commutator ring 40 and are arranged on radial opposing sides of the commutator ring 40. Each commutator brush 46 is electrically connected to a respective choke coil 50 in order to minimize electromagnetic interference generated by the brush sparking of the commutator brushes 46.

Figure 2:
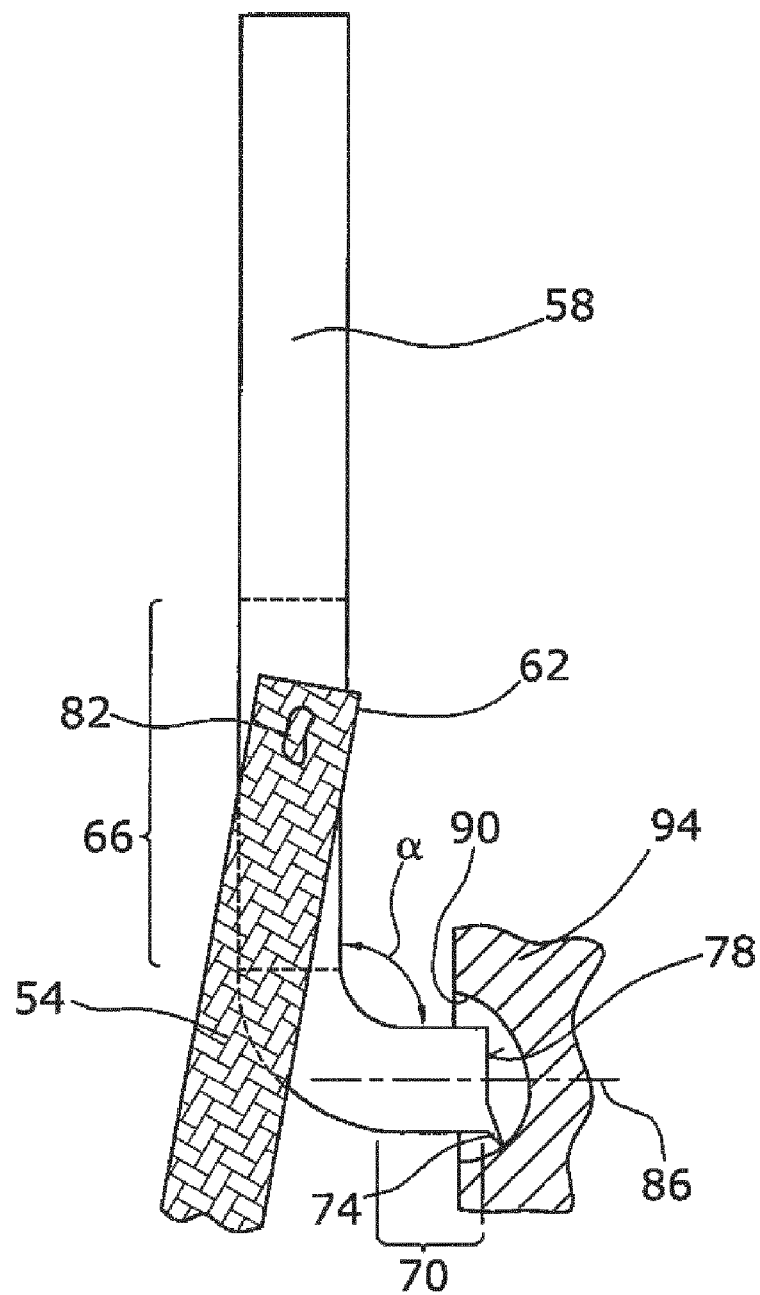
FIG. 2 shows an enlarged section of FIG. 1 of the connection between the braid wire and the coil wire of the commutator of the electric motor.

FIG. 2 shows an enlarged view of the electrical connection between the commutator brush 46 and the choke coil 50 of FIG. 1. The commutator brush 46 is electrically connected to a coil wire 58 by a flexible braid wire 54. The flexible braid wire 54 comprises multiple thin filament wires, which are braided to define a ribbon-shaped braid wire 54. The braid wire 54 is electrically and mechanically connected to the stiff coil wire 58, which has a diameter of a couple of millimeters, via welding a wire end 62 of the braid wire 54 to a welding portion 66 of the coil wire 58. The welding portion 66 is an axial section of the coil wire 58, where the braid wire 54 is intended to be welded to the coil wire 58.

The coil wire 58 comprises a wire end portion 70 which is arranged adjacent to the welding portion 66 of the coil wire 58. Due to the cutting process of the stiff coil wire 58, the wire end portion 70 is provided with a sharp edge 74 like, for example, a burr. The wire end portion 70 is bent in relation to the welding portion 66 and is thereby bent away from the braid wire 54 so that a wire end surface 78 of the wire end portion 70 is not facing the braid wire 54. A welding area 82, where the coil wire 58 is materially bonded to the braid wire 54, faces in a direction which is substantially orthogonal to a longitudinal direction 86 of the wire end portion 70 of the coil wire 58. An angle α between the welding portion 66 and the wire end portion 70 of the coil wire 58 is 90°. It is thereby prevented that the sharp edge 74 of the coil wire 58 comes into contact with the braid wire 54. The braid wire 54 cannot thus be damaged by the sharp edge 74 of the coil wire 58.

The wire end surface 78 is inserted into a pocket 90 which has a concave shape. The pocket 90 is defined by a frame 94 of the motor housing 14. The pocket 90 restricts the lateral freedom of movement of the end portion 70 so that vibrations of the coil wire 58 are reduced. The dynamic load on the welding connection is also consequently decreased.

It should be clear from the above that the automotive electric motor with a mechanical commutation is not limited to the above described embodiment. Other designs of the pocket can in particular be used. Other bending angles and other designs of the welding area are also conceivable. Reference should also be had to the appended claims.

LIST OF REFERENCE NUMERALS 10 automotive electric motor
14 motor housing
18 motor stator
22 motor rotor
26 commutator arrangement
30 rotor shaft
34 first bearing
38 second bearing
40 commutator ring
42 electrical connection
46 commutator brush 50 choke coil
54 flexible braid wire
58 coil wire
62 wire end
66 welding portion
70 wire end portion
74 sharp edge
78 wire end surface
82 welding area
86 longitudinal direction of the wire end portion
90 pocket
94 frame
α angle

What is claimed is:

1. An automotive electric motor with a mechanical commutation, the automotive electric motor comprising:
   a stiff coil wire comprising a welding portion and an end portion which is arranged adjacent to the welding portion, the end portion comprising an end surface; and
   a flexible braid wire comprising a wire end which is electrically and mechanically connected to the stiff coil wire at the welding portion via a welding,
   wherein,
   the stiff coil wire is bent between the welding portion and the end portion so that the end portion is bent in relation to the welding portion, so that the end portion is bent away from the flexible braid wire, and so that the end surface of the end portion of the stiff coil wire does not face the flexible braid wire.

2. The automotive electric motor as recited in to claim 1, wherein a bending angle of from 60°-120° is defined between the welding portion and the end portion of the stiff coil wire.

3. The automotive electric motor as recited in to claim 1, further comprising:
   a welding area which faces in a direction which is substantially orthogonal to a longitudinal direction of the end portion of the stiff coil wire.

4. The automotive electric motor as recited in claim 1, further comprising:
   a pocket,
   wherein,
   the end surface of the stiff coil wire is inserted into the pocket.

5. The automotive electric motor as recited in claim 1, wherein the end surface of the stiff coil wire is fixed in the pocket.

6. The automotive electric motor as recited in to claim 1, wherein the end portion of the stiff coil wire comprises a sharp edge.

7. The automotive electric motor as recited in claim 1, wherein the stiff coil wire defines a choke coil.

8. The automotive electric motor as recited in claim 1, wherein the flexible braid wire defines a brush wire of a mechanical commutator arrangement.

9. The automotive electric motor as recited in claim 1, wherein the end surface of the stiff coil wire is a surface which is generated by a cutting process.

* * * * *